US011449207B1

(12) United States Patent
Toff et al.

(10) Patent No.: US 11,449,207 B1
(45) Date of Patent: *Sep. 20, 2022

(54) CLOUD-BASED TOOL FOR CREATING VIDEO INTERSTITIALS

(71) Applicant: Google LLC, Mountain View, CA (US)

(72) Inventors: Jason Toff, New York, NY (US); Rushabh Ashok Doshi, Menlo Park, CA (US); Dror Shimshowitz, Menlo Park, CA (US); Thomas Benton Bridgwater, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/146,401

(22) Filed: Jan. 11, 2021

Related U.S. Application Data

(63) Continuation of application No. 15/419,975, filed on Jan. 30, 2017, now Pat. No. 10,891,038, which is a (Continued)

(51) Int. Cl.
   *G06F 3/0484*  (2022.01)
   *G06F 16/40*  (2019.01)
   (Continued)

(52) U.S. Cl.
   CPC .......... *G06F 3/0484* (2013.01); *G06F 3/0482* (2013.01); *G06F 3/04842* (2013.01);
   (Continued)

(58) Field of Classification Search
   CPC ............... G06F 16/4387; G06F 16/273; G06F 16/3344; G06F 16/4393; G06F 16/637; G06F 16/639; G06F 16/9535; G06F 21/10; G06F 21/6236; G06F 2213/0038; G06F 2216/01; G06F 2221/2113;
   (Continued)

(56) References Cited

U.S. PATENT DOCUMENTS

2002/0147638 A1  10/2002  Banerjee et al.
2004/0019396 A1   1/2004  McMahon et al.
(Continued)

*Primary Examiner* — Rayeez R Chowdhury
(74) *Attorney, Agent, or Firm* — Lowenstein Sandler LLP

(57) ABSTRACT

An interstitial creation interface is provided for display on a user device, the interstitial creation interface comprising a selectable interstitial indicator to add an interstitial to a playlist comprising a plurality of media items, wherein the selectable interstitial indicator is to be positioned between a first media item and a second media item of the plurality of media items. Responsive to a user selection of the selectable interstitial indicator, presentation of a plurality of user interface (UI) elements is caused to allow a user of the user device to specify interstitial configuration parameters for the interstitial being added to the playlist. User input is received for at least a subset of the plurality of UI elements to specify the interstitial configuration parameters for the interstitial. The interstitial is created based on the received interstitial configuration parameters, wherein the created interstitial is supplemental content to be added before or after one of a plurality of files of the plurality of media items.

18 Claims, 11 Drawing Sheets

Related U.S. Application Data continuation of application No. 13/973,889, filed on Aug. 22, 2013, now Pat. No. 9,557,896.

(51) Int. Cl.
| | |
|---|---|
| *G06F 16/438* | (2019.01) |
| *G06F 3/0482* | (2013.01) |
| *G06F 3/04842* | (2022.01) |
| *G06F 3/04847* | (2022.01) |
| *G11B 27/036* | (2006.01) |
| *G11B 27/34* | (2006.01) |
| *H04L 67/10* | (2022.01) |

(52) U.S. Cl.
CPC .......... *G06F 3/04847* (2013.01); *G06F 16/40* (2019.01); *G06F 16/4387* (2019.01); *G11B 27/036* (2013.01); *G11B 27/34* (2013.01); *H04L 67/10* (2013.01)

(58) Field of Classification Search
CPC ........... G06F 2221/2137; G06F 16/735; G06F 16/7867; G06F 9/4843; G06F 16/40; G06F 3/0482; G06F 3/0484; G06F 3/04842; G06F 3/04847; G06F 16/24; G06F 16/29; G06F 16/50; G06F 16/51; G06F 16/583; G06F 16/5838; G06F 16/5846; G06F 16/5854; G06F 16/5866; G06F 16/94; G06F 16/9554; G06F 16/9558; G06F 40/134; G06F 3/012; G06F 3/013; G06F 3/165
See application file for complete search history.

(56) References Cited

U.S. PATENT DOCUMENTS

| | | |
|---|---|---|
| 2005/0216417 A1 | 9/2005 | Risan et al. |
| 2006/0153040 A1 | 7/2006 | Girish et al. |
| 2006/0294538 A1 | 12/2006 | Li et al. |
| 2007/0083556 A1 | 4/2007 | Plastina et al. |
| 2008/0033806 A1 | 2/2008 | Howe et al. |
| 2008/0066107 A1* | 3/2008 | Moonka ................. G11B 27/28 725/35 |
| 2008/0263583 A1* | 10/2008 | Heath ................. G06Q 30/0273 705/14.69 |
| 2008/0307454 A1* | 12/2008 | Ahanger .......... H04N 21/47202 725/36 |
| 2009/0282454 A1* | 11/2009 | Ekstrand .......... H04N 21/64315 725/134 |
| 2009/0300699 A1 | 12/2009 | Casagrande et al. |
| 2010/0023398 A1* | 1/2010 | Brown ............... G06Q 30/0251 705/14.72 |
| 2010/0195972 A1* | 8/2010 | Casagrande ........... H04N 5/147 386/278 |
| 2010/0223136 A1 | 9/2010 | Wormald et al. |
| 2010/0322592 A1* | 12/2010 | Casagrande ........... H04N 5/147 386/285 |
| 2013/0298159 A1* | 11/2013 | You ...................... H04N 21/251 725/34 |

\* cited by examiner

US 11,449,207 B1

CLOUD-BASED TOOL FOR CREATING VIDEO INTERSTITIALS

PRIORITY CLAIM

This application is a continuation application of U.S. Non-Provisional patent application Ser. No. 15/419,975, filed Jan. 30, 2017, and entitled, "CLOUD-BASED TOOL FOR CREATING VIDEO INTERSTITIALS," which is a continuation of U.S. Non-Provisional patent application Ser. No. 13/973,889, filed Aug. 22, 2013, and entitled "CLOUD-BASED TOOL FOR CREATING VIDEO INTERSTITIALS", now U.S. Pat. No. 9,557,896, which is incorporated herein by reference for all purposes.

TECHNICAL FIELD

This disclosure relates to the field of media viewing services and, in particular, to a cloud-based tool for creating video interstitials.

BACKGROUND

On the Internet, content sharing platforms or other applications allow users to upload, view, and share digital content such as media items. Such media items may include audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers) to use, play, and/or consume the media items (e.g., watch digital videos, listen to digital music).

The media items in the content sharing platforms can be organized into playlists. Playlists are a group of media items that a user may consume in a single session or in a particular order. In some cases, the media items in a playlist may be related, such as if they share a similar subject matter or theme. In other cases, the media items in the playlist may not necessarily be related, or the relation may not be obvious. In convention content sharing platforms, however, there is no easy way to provide a user with the context for a given video. As such, users may not understand why certain media items are grouped together in a playlist or why they are being shown the media items in a certain order. This can result in a diminution of the user experience. In addition, a playlist curator (i.e., an individual or organization that complied and manages the playlist, but did not necessarily create the content in the individual media items) has no way to monetize the curated compilation. Without this monetary incentive, there may be fewer playlists available for users to enjoy.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, an interstitial creator identifies a playlist of media items, the playlist comprising pointers to the media items. The interstitial creator displays a visual indicator at a location in the playlist to indicate where an interstitial can be added. The interstitial creator receives a request to insert an interstitial at a location in the playlist. The request may include a selection of the displayed visual indicator at a location after a first media item in the playlist and before a second media item in the playlist. In response to the request, the interstitial creator provides an interstitial creation interface and receives, through the interstitial creation interface, interstitial configuration parameters. The interstitial creation interface comprises interstitial template options for at least one of a text interstitial, an image interstitial or a video interstitial. The interstitial creator creates the interstitial based on the received interstitial configuration parameters and inserts a pointer to the interstitial into the playlist at the location.

In one implementation, the interstitial configuration parameters for a text interstitial comprise an input text and a duration of the interstitial. To create the interstitial, the interstitial creator converts the input text to a video interstitial. In one implementation, the interstitial configuration parameters for an image interstitial comprise an input image and a duration of the interstitial, wherein the input image comprises at least one of an uploaded image or a captured image. To create the interstitial, the interstitial creator converts the input image to a video interstitial. In one implementation, the interstitial configuration parameters for a video interstitial comprise an input video and a duration of the interstitial, wherein the input video comprises at least one of an uploaded video or a captured video. To create the interstitial, the interstitial creator converts the input video to a video interstitial.

BRIEF DESCRIPTION OF THE DRAWINGS

The present disclosure is illustrated by way of example, and not by way of limitation, in the figures of the accompanying drawings.

DETAILED DESCRIPTION

Figure 1:
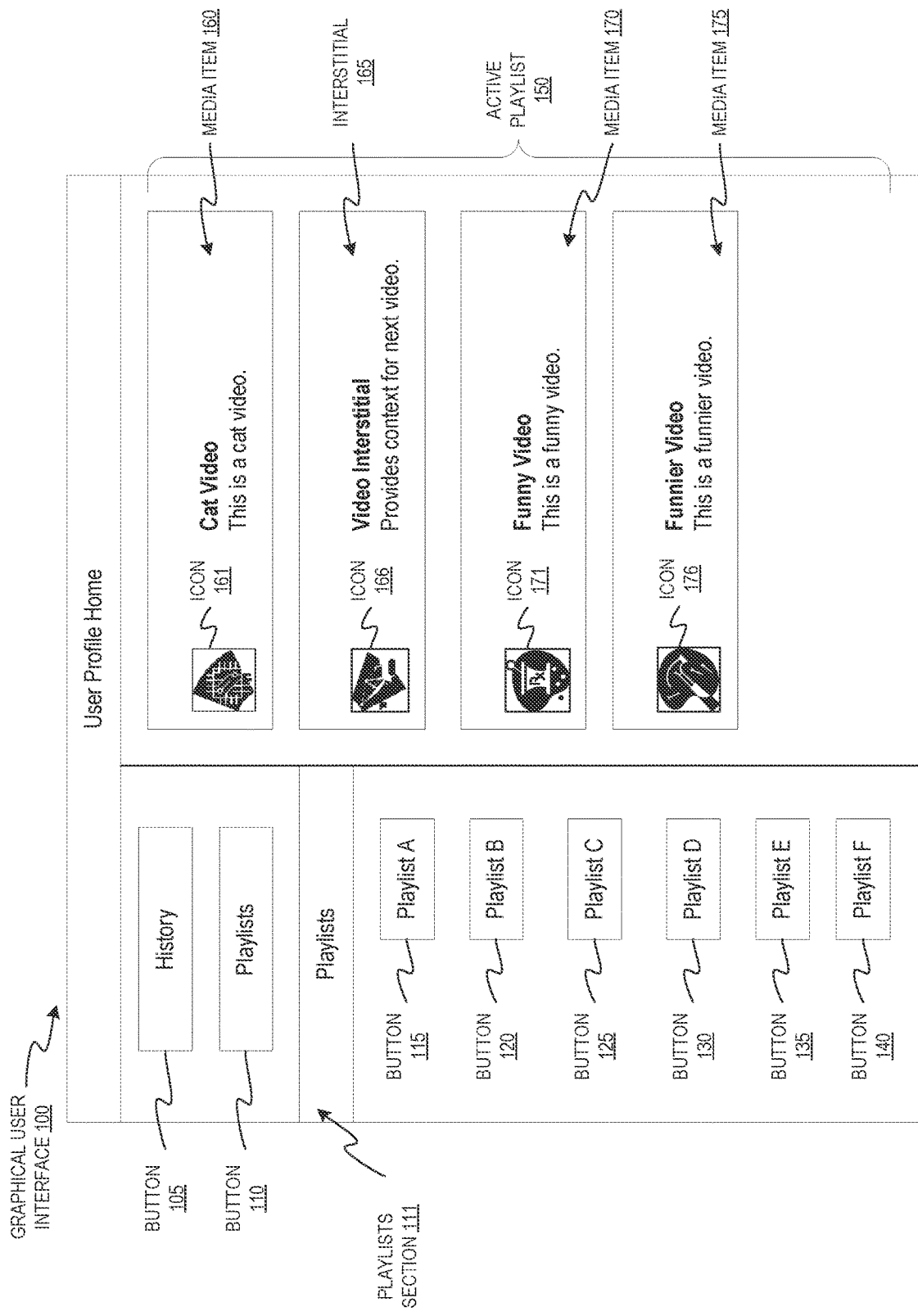
FIG. 1 is a block diagram illustrating an example graphical user interface (GUI) in accordance with one implementation of the present disclosure.

Implementations are described for a cloud-based tool for creating video interstitials. In one implementation, a content sharing platform can include one or more playlists of media items that are viewable over the Internet. A playlist may be a list and/or an order of different media items that can be presented (or played) in sequential or shuffled order without interaction from the user. A media viewer (e.g., a media viewer application and/or a web browser) may play the media items on a playlist in the order in which the media items are listed on the playlist. The media items may include, for example, digital videos viewable over the Internet. In other implementations, however, the media items may include other types of media, such as digital movies, digital photos, digital music, website content, social media updates, electronic books (ebooks), electronic magazines, digital newspapers, digital audio books, electronic journals, web blogs, real simple syndication (RSS) feeds, electronic comic books, software applications, and the like. Each playlist in the content sharing platform may be managed by a curator. The curator may be an individual or organization that complied and manages the playlist, but did not necessarily create the content in the individual media items.

In one implementation, the content sharing platform includes an interstitial creator to allow for the creation of video interstitials to be inserted into the playlist. An interstitial is a piece of additional content that is displayed before, after, or in between pieces of expected content. The interstitial may take the form of a video, image, text, or other format. The interstitial may be used for a variety of purposes, such as to provide context or an introduction for an upcoming video, provide an advertisement, or to provide other information to the viewer. In one implementation, the interstitial creator is a component, module, plug-in or add-on to a video editor or content creator running on a server in the content sharing platform. The interstitial creator may allow a playlist curator to quickly and easily create interstitials and include them in the playlist for the benefit of the viewer. The interstitial creator may provide templates for various formats of interstitials, including text, images, or video, and may collect interstitial configuration parameters from the curator. Using the selected template and the collected configuration parameters, the interstitial creator may automatically generate the interstitial and insert the interstitial into the playlist at a location selected by the curator.

The cloud-based tool for creating video interstitials described herein simplifies the process of creating interstitials from the user's perspective. The automated processing prevents the curator from having to go through the potentially complex and time consuming process of manually creating a video interstitial, performing any necessary editing, uploading it to the content sharing platform and adding the interstitial to a given playlist. In addition, having the interstitial creator be part of the content sharing platform (e.g., in the cloud) allows the curator to take advantage of advanced processing systems in the content sharing platform rather than relying on the resources of the curators personal computing device.

FIG. 1 is a block diagram illustrating an example graphical user interface (GUI) 100 in accordance with one implementation of the present disclosure. In one implementation, the GUI 100 may be a homepage of a user of a content sharing platform. For example, the GUI 100 may be presented by and/or displayed within a web browser when the user accesses the content sharing platform via the web browser. In another implementation, the GUI 100 may be a home interface or a main interface presented by a media viewer (e.g., an app, an application, a program, a software module/component, etc., that may be used to view, play, and/or consume media items). Although the GUI 100 is illustrated using buttons (e.g., buttons 105, 110, 115, etc.), other implementations may use links and/or other graphical user interface controls or elements in place of one or more of the buttons.

In one implementation, the GUI 100 includes buttons 105 and 110. Button 105 may allow the user to view a history of the media items that the user has consumed (e.g., viewed or played). For example, when the user selects and/or activates the button 105, a new GUI that includes a list of the last (e.g., ten, twenty, fifty or hundred) media items viewed by the user may be presented to the user. The button 110 may allow a user to view different playlists of media items that the user has previously created and/or obtained. A playlist may be a list and/or an order of different media items that can be presented (or played) in sequential or shuffled order without interaction from the user. A media viewer (e.g., a media viewer application and/or a web browser) may play the media items on a playlist in the order in which the media items are listed on the playlist. A user may also transition between media items on a playlist. For example, a user may play the next media item on the playlist or may select a particular media item in the playlist.

In one implementation, the GUI also includes a playlists section 111 that includes a list of one or more playlists which a user or curator has created. In one implementation, the playlists section 111 may include a list of all playlists the user or curator has created or is managing. In another implementation, the playlists section 111 may include a subset of playlists the user or curator has created. For example, the playlists section 111 may present a predefined number of playlists (e.g., 6 playlists), the playlists that the curator accesses most frequently, the playlists that the curator has accessed most recently, etc. Other implementations of determining the playlist to include in a subset of playlists displayed can be used without departing from the scope of the disclosure. As illustrated in FIG. 1, the playlists section 111 includes buttons 115, 120, 125, 130, 135 and 140. Button 115 is labeled "Playlist A" to indicate that that curator has created Playlist A, button 120 is labeled "Playlist B" to indicate that that curator has created Playlist B, button 125 is labeled "Playlist C" to indicate that that curator has created to Playlist C, button 130 is labeled "Playlist D" to indicate that that curator has created Playlist D, button 135 is labeled "Playlist E" to indicate that that curator has created Playlist E, and button 140 is labeled "Playlist F" to indicate that that user has created Playlist F. In one implementation, a list of media items in a playlist may be presented to the user when the user activates a corresponding button for the playlist. For example, if the user activates (e.g., clicks on or selects) button 135, the GUI 100 may display a list of videos that are in Playlist E. In one implementation, when a user activates (e.g., clicks, selects, etc.) one of the buttons 115 through 140, a menu may appear on the GUI 100 listing media items associated with the playlist associated with the activated button. In another implementation, when a user activates one of the buttons 115 through 140, a popup window including a graphic representation (e.g., picture of a single frame from the media item) of media items in the playlist associated with the activated button may appear on the GUI 100. For example, media items from the playlist may be displayed on the active playlist 150, as discussed further below. It should be understood that in other implementations, other visual indicators such as graphic representations, and/or text can be presented to a user to provide media items and playlists to the user.

The content sharing platform may collect demographic information pertaining to groups of users (e.g., age of user groups, geography of user groups, such as country, state, city) and may store the information in one or more data stores (e.g., hard disks, memories, databases, etc.). In situations in which the implementations discussed herein collect personal information and/or demographic information about users, or may make use of personal information and/or demographic information, the user may be provided with an opportunity to control whether programs or features collect entity information (e.g., information about a user's social network, social actions or activities, profession, a user's preferences, or a user's current location), or to control whether and/or how to receive content from the content sharing platform that may be more relevant to the user. In addition, certain data may be treated in one or more ways before it is stored or used, so that personally identifiable information is removed. For example, a user's identity may be treated so that no personally identifiable information can be determined for the user, or an user's geographic location may be generalized where location information is obtained (such as to a city, ZIP code, or state), so that a particular location of a user cannot be determined. Thus, the user may have control over how information is collected about the user and used by the content sharing platform.

The active playlist 150 can include information about media items associated with the playlist associated with the activated button. As illustrated in FIG. 1, the active playlist 150 includes media items 160, 170 and 175, as well as interstitial 165. Collectively, media items media items 160, 170 and 175, and interstitial 165 may be referred to as playlist items. Each playlist item may include information about the playlist item, such as the title of the playlist item, a description of the playlist item, and an icon for the playlist item. For example, the media item 160 includes the title of the video (e.g., Cat Video), a description of the video (e.g., "This is a cat video"), and an icon 161. An icon (e.g., icon 161) may be text, a thumbnail, an image, a frame, and/or some other graphic used to represent the media item 160. Icons 166, 171, and 176 are used to represent the playlist items (e.g., videos) 165, 170, and 175 respectively. Although a list of videos are shown as being included in the active playlist 150, it should be understood that in other implementations, other playlist items may be shown in the GUI 100. For example, an image (e.g., a JPEG) may be shown in the GUI 100. In another example, digital music (e.g., an MP3) may be played in the GUI 100. In yet another example, social media information (e.g., a tweet, a like, etc.) may be shown in the GUI 100.

The additional playlist items in active playlist 150 may be other media items or interstitials. For example, the interstitial 165 includes the title of the interstitial (e.g., Video Interstitial), a description of the interstitial (e.g., "This is another cat video"), and icon 166. Media item 170 includes the title of the video (e.g., Funny Video), a description of the video (e.g., "This is a funny video"), and icon 171. Media item 175 includes the title of the video (e.g., Funnier Video), a description of the video (e.g., "This is a funnier video"), and icon 176.

Interstitial 165 may be a video that is displayed before, after, or in between pieces of expected content (e.g., media items 160 and 170). In one implementation, interstitial 165 may take the form of a video. The video interstitial may include an actual video or may include multiple frames of a single image or of text that are converted to a video. In one implementation, video interstitial 165 may be used to provide context or an introduction for the upcoming video (e.g., media item 170). In other implementations, interstitial 165 may be used for other purposes, such as to provide an advertisement, or to provide other information to the viewer. Additional details of video interstitials are provided below.

Figure 2:
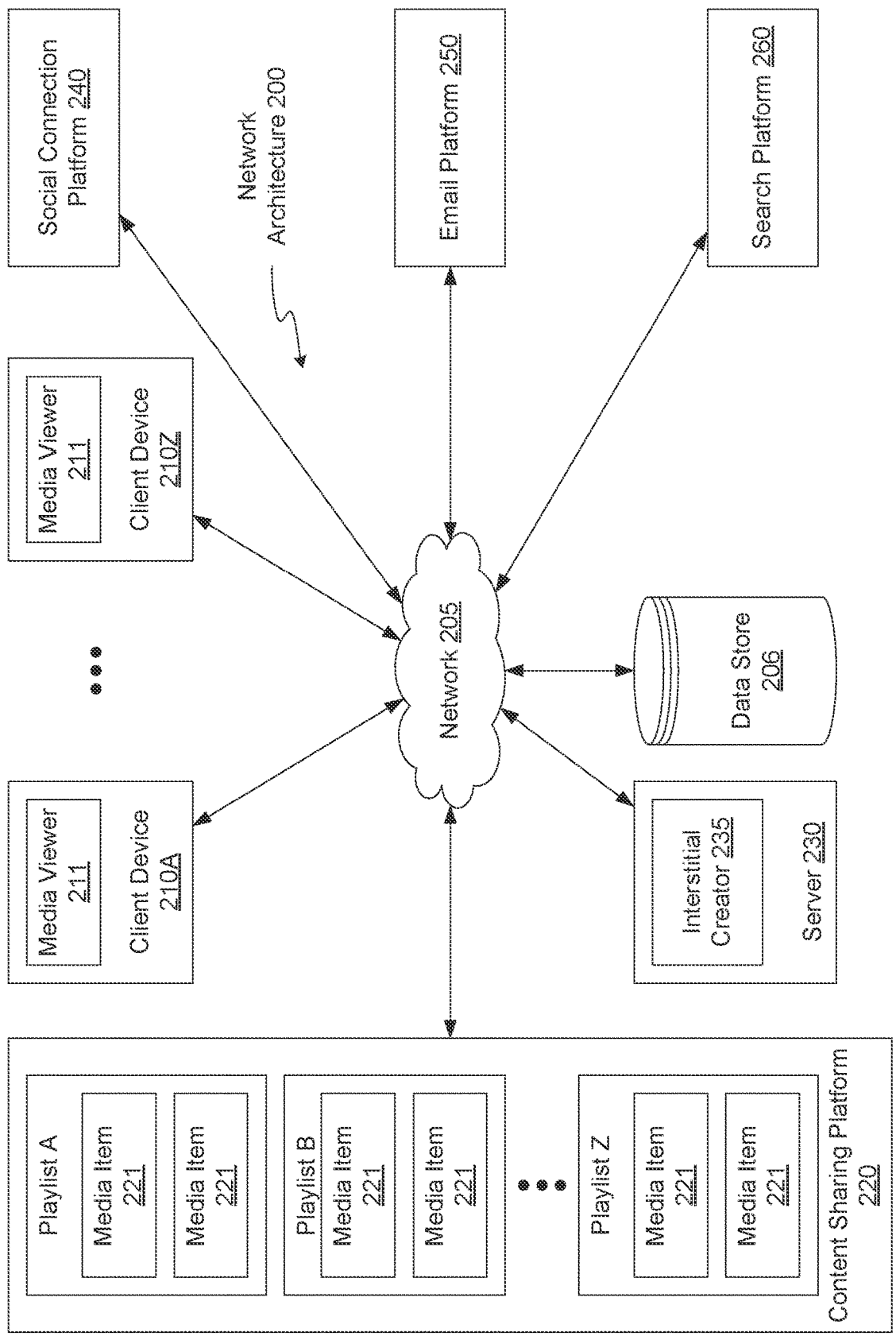
FIG. 2 is a block diagram illustrating an exemplary network architecture in which implementations of the present disclosure may be implemented.

FIG. 2 is a block diagram illustrating an exemplary network architecture 200 in which implementations of the present disclosure may be implemented. In one implementation, the network architecture 200 includes client devices 210A through 210Z, a network 205, a data store 206, a content sharing platform 220, a server 230, a social connection platform 240, an email platform 250, and a search platform 260. In one implementation, network 205 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 206 may be may be a memory (e.g., random access memory), a cache, a drive (e.g., a hard drive), a flash drive, a database system, or another type of component or device capable of storing data. The data store 206 may also include multiple storage components (e.g., multiple drives or multiple databases) that may also span multiple computing devices (e.g., multiple server computers).

The client devices 210A through 210Z may each include computing devices such as personal computers (PCs), laptops, mobile phones, smart phones, tablet computers, netbook computers, etc. Each client device may include a media viewer 211. In one implementation, the media viewer 211 may be an application that allows users to view content, such as images, videos, web pages, documents, etc. For example, the media viewer 211 may be a web browser that can access, retrieve, present, and/or navigate content (e.g., web pages such as Hyper Text Markup Language (HTML) pages, digital media items, etc.) served by a web server. The media viewer 211 may render, display, and/or present the content (e.g., a web page, a media viewer) to a user. The media viewer 211 may also display an embedded media player (e.g., a Flash® player or an HTML5 player) that is embedded in a web page (e.g., a web page that may provide information about a product sold by an online merchant). In another example, the media viewer 211 may be a standalone application that allows users to view digital media items (e.g., digital videos, digital images, electronic books). The media viewer 211 may be provided to the client devices 210A through 210Z by the server 230 and/or content sharing platform 220. For example, the media viewer 211 may be an embedded media player that is embedded in a web page provided by the content sharing platform 220. In another example, the media viewer 211 may be an application that is downloaded from the server 230.

In one implementation, content sharing platform 220 may include one or more computing devices (such as a rack mount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 220 may allow a user to consume, upload, search for, approve of ("like"), dislike, and/or comment on media items. The content sharing platform 220 may also include a website (e.g., a webpage) that may be used to provide a user with access to the media items. The content sharing platform 220 may include multiple playlists (e.g., playlists A through Z). Each playlist may include one or more media items 221. Examples of a media item 221 can include, and are not limited to, digital videos, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, and the like. A media item 221 may be consumed via the Internet and/or via a mobile device application. For brevity and simplicity, an online video (also hereinafter referred to as a video) is used as an example of a media item throughout this document. As used herein, "media," media items," "online media items," "digital media," and "digital media items" can include an electronic file that can be executed or loaded using software, firmware or hardware configured to present the digital media item to an entity. In one implementation, the content sharing platform 220 may store the media items using the data store 206.

Social connection platform 240 may include one or more computing devices (e.g., servers), data stores, networks, software components, and/or hardware components that may be used to allow users to connect to, share information, and/or interact with each other. Social connection platform 240 may present to a user a listing (e.g., activity feed, feed, stream, wall, etc.) of objects (such as posts, content items (e.g., video, images, audio, etc.), status updates, favorability indications, tags, messages, and so on) generated by other users of a social network. Social connection platform 240 may also include a content sharing aspect that allows users to upload, view, tag, and share content, such as text content, video content, image content, audio content, and so on. Other users of social connection platform 240 may comment on the shared content, discover new content, locate updates, share content, and otherwise interact with the provided content. In one implementation, content sharing platform 220 may be integrated with social connection platform 240. For example, social connection platform 240 may use content sharing platform 220 to allow users to upload and/or share content. In another implementation, social connection platform 240 may be separate from content sharing platform 220. In one implementation, social connection platform 240 may also include chat functionality (e.g., a chat platform) to allow users to chat (e.g., to instant message) with each other.

In one implementation, email platform 250 may be one or more computing devices (e.g., servers), data stores, networks, software components, and/or hardware components that may be used to allow users to send and/or receive electronic-mail (emails) to each other. For example, a first user may use the email platform 250 to send an email to a second user regarding the time and location of a particular event. The first user may also attach files (e.g., video files, image files, text files, etc.) to the email. In one implementation, the email platform 250 may also include chat functionality (e.g., a chat platform) to allow users to chat (e.g., to instant message) with each other. In another implementation, the search platform 260 may be one or more computing devices, data stores, networks, software components, and/or hardware components that may be used to allow users to search for information and/or data. For example, the search platform 260 may allow a user to search the Internet and/or other networks for articles, blogs, websites, webpages, images, videos, and/or other content related to a particular topic (e.g., how to fix a car). The search platform 260 may also include a search engine.

In one implementation, server 230 may include one or more computing devices (e.g., a rack mount server, a server computer, etc. In one implementation, server 230 may be included in one or more of content sharing platform 220, social connection platform 240, email platform 250, and search platform 260. In another implementation, server 230 may be separate from content sharing platform 220, social connection platform 240, email platform 250, and search platform 260 but may communicate (e.g., exchange data) with content sharing platform 220, social connection platform 240, email platform 250, and search platform 260. In one implementation, server 230 includes a interstitial creator 235. Interstitial creator 235 may allow a user of the content sharing platform 220 to quickly and easily create video interstitials that may appear before, between or after the media items 221 in one of playlists A through Z In one implementation, interstitial creator 235 may be a component, module, plug-in or add-on to a video editor or content creator running on server 230. In other implementations, interstitial creator 235 may be associated with some other piece of software or may be a standalone application, module, or program. Additional details of interstitial creator 235 are provided below.

Figure 3:
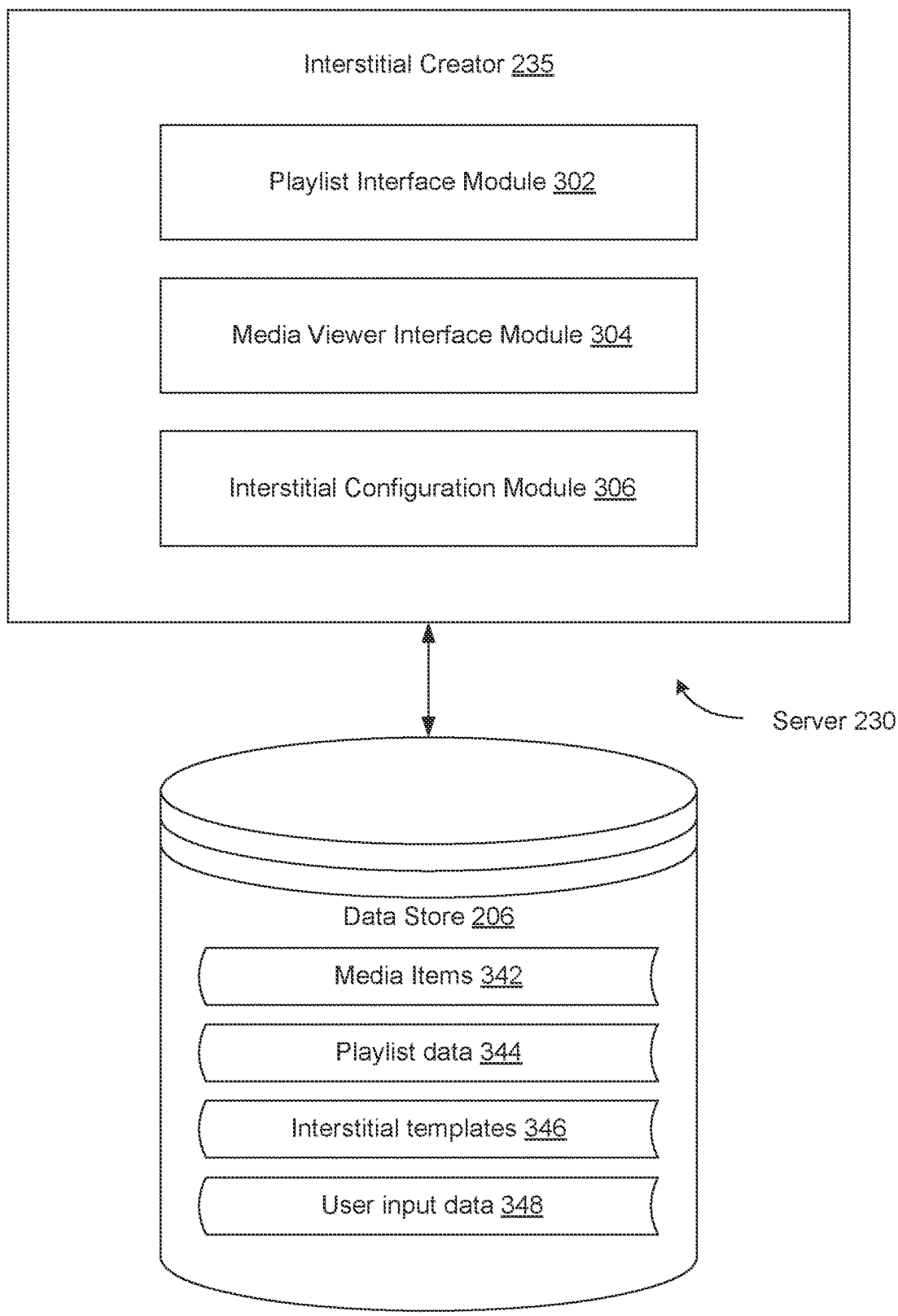
FIG. 3 is a block diagram illustrating interstitial creator 235, according to an implementation.

FIG. 3 is a block diagram illustrating interstitial creator 235, according to an implementation. In one implementation, interstitial creator 235 includes playlist interface module 302, media viewer interface module 304, and interstitial configuration module 306. This arrangement of modules and components may be a logical separation, and in other implementations, these modules or other components can be combined together or separated in further components, according to a particular implementation. In one implementation, data store 206 is connected to interstitial creator 235 and includes media items 342, playlist data 344, interstitial templates 346 and user input data 348. In one implementation, server 230 may include both interstitial creator 235 and data store 206. In another implementation, data store 206 may be external to server 230 and may be connected to server 230 over a network or other connection. In other implementations, server 230 may include different and/or additional components which are not shown to simplify the description. Data store 206 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one implementation, playlist interface module 302 manages the creation and editing of a playlist of media items, in response to commands from a content curator. For example, playlist interface module 302 may receive indications of two or more media items 342, which may be stored in data store 206, and create a new playlist for the media items or add them to an existing playlist. In one implementation, playlist interface module 302 stores the playlist as playlist data 344 in data store 206. The playlist data 344 may include a group of pointers or other references to the actual media items 342 that are stored together as a playlist. Each playlist in playlist data 344 may be assigned a unique identifier that can be used to differentiate one playlist from another. When a curator attempts to edit a playlist, such as active playlist 150, playlist interface module 302 can retrieve the corresponding playlist from playlist data 344 using this unique identifier and perform the editing operations, as appropriate.

Figure 6A:
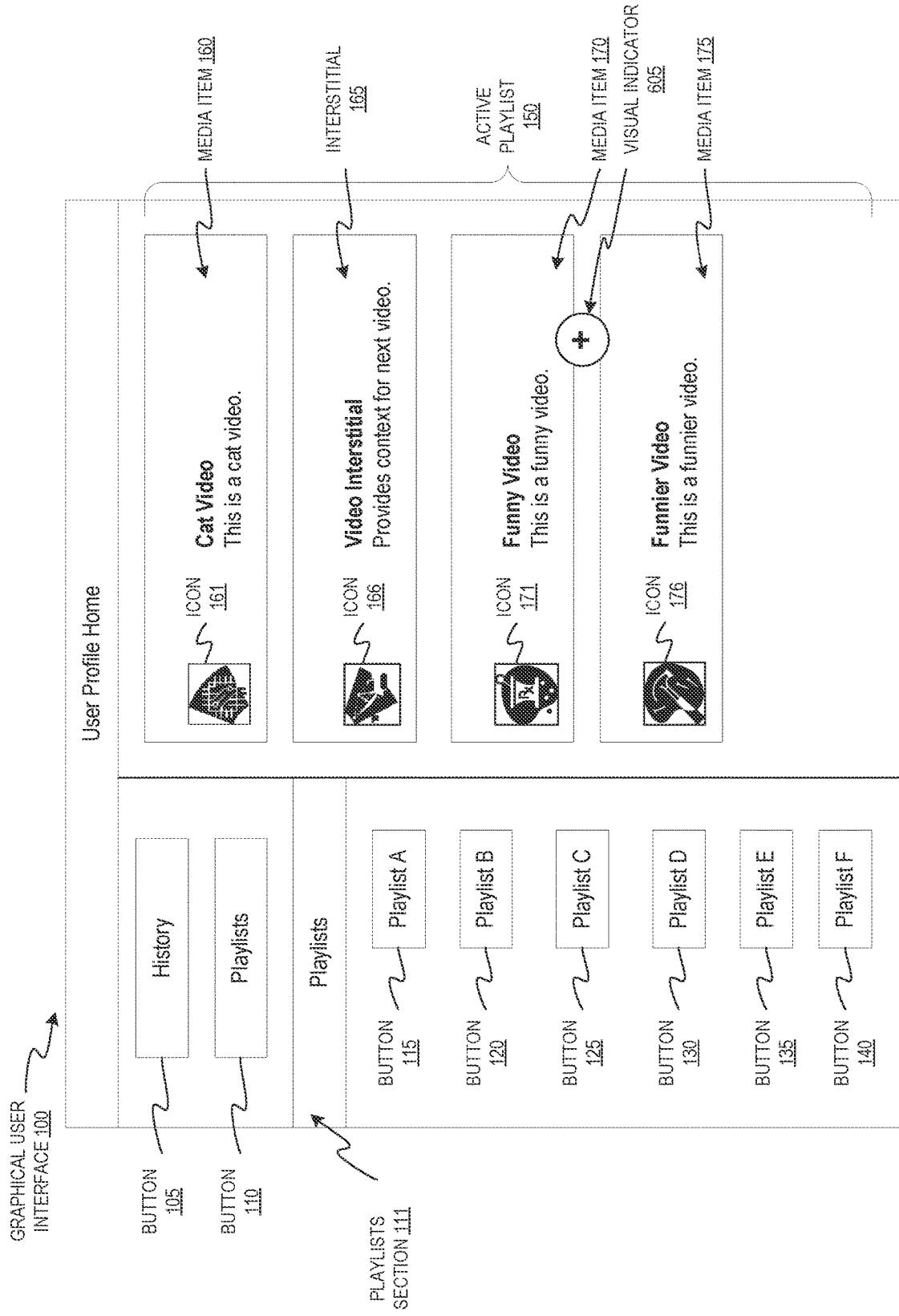
FIG. 6A is a block diagram illustrating an example GUI with visual indicator for inserting an interstitial, according to an implementation.

In one implementation, media viewer interface module 304 generates and/or controls interactions with a user interface, such as GUI 100, that is part of a website or application (e.g., mobile application or app), such as media viewer 211, running on a client device 210A-210Z. For example, media viewer interface module 304 may display media items, such as media items 160-175 to be displayed in the active playlist 150 in GUI 100. In one implementation, media viewer interface module 304 may also display a visual indicator 605 at a location in the active playlist 150 where an interstitial may be added, as shown in FIG. 6A. The visual indicator 605 may take the form of an icon, a symbol, a text block, an arrow, a line, or some other indicator that indicates the location in the playlist 150 where an interstitial may be added. In one implementation, this location is after a first media item and before a second media item (i.e., between two media items). In other implementations, however, the location may be at the beginning or end of the playlist (i.e., before the first media item in the playlist or after the last media item in the playlist). Media viewer interface module 304 may also receive a selection of the visual indicator 605 (e.g., through a computer mouse, touchscreen, keyboard, etc.) indicating a curators desire to insert an interstitial into the playlist.

In one implementation, interstitial configuration module 306 manages the creation and configuration of an interstitial to be added to a playlist of media items. In response to the media viewer interface module 304 receiving a selection of the visual indicator 605, interstitial configuration module 306 may begin the creation and configuration of the interstitial. In one implementation, interstitial configuration module 306 may provide one or more interstitial templates 346 to the curator through the media viewer 211. The interstitial templates 346 may be standardized formats for various types of interstitials. The types may include, for example, text interstitials, image interstitials, video interstitials, or other types of interstitials. Interstitial configuration module 306 may receive a selection of one of the interstitial templates 346 and then collect interstitial configuration parameters according to the selected template. In one implementation, the interstitial configuration parameters for a text interstitial include an input text, one or more text options, a duration of the interstitial, and optionally text presentation effects (e.g., animations). The interstitial configuration parameters for an image interstitial may include an input image, a duration of the interstitial, and optionally image presentation effects (e.g., animations). The input image may be either an uploaded image or a captured image (e.g., via a camera in client device 210A-Z). The interstitial configuration parameters for a video interstitial can include an input video, a duration of the interstitial, and optionally video presentation effects (e.g., animations). The input video may be an uploaded video or a captured video, similar to an input image. Interstitial configuration module 306 may store these received configuration parameters as user input data 348 in data store 206.

Interstitial configuration module 306 may generate an interstitial based on the selected interstitial template 346 and the received user input data 348. In one implementation, the interstitial may be stored as one of media items 342 in data store 206. The interstitial may be treated much the same as any other media item 342 in the manner in which it is stored and the manner in which it is added to a playlist. For example, once created, interstitial configuration module 306 may signal playlist interface module 302 to add a pointer or other reference to the interstitial from media items 342 to the active playlist in playlist data 344. As a result, the interstitial may be added to the playlist and displayed at the designated location when the playlist is viewed by the curator or other user.

Figure 4:
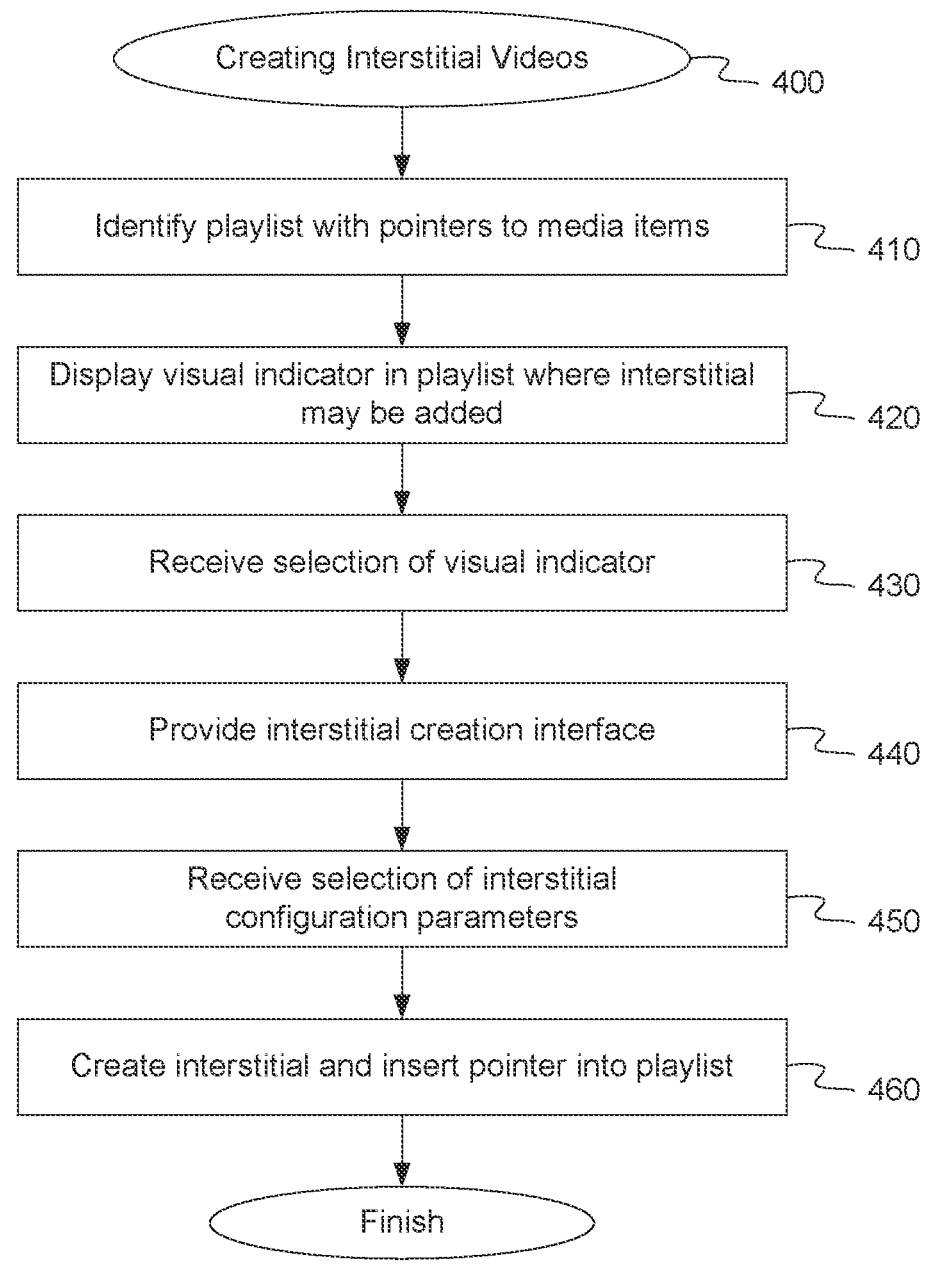
FIG. 4 is a flow diagram illustrating a method for creating interstitial videos, according to some implementations.

FIG. 4 is a flow diagram illustrating a method for creating interstitial videos, according to some implementations. The method 400 may be performed by processing logic that comprises hardware (e.g., circuitry, dedicated logic, programmable logic, microcode, etc.), software (e.g., instructions run on a processing device to perform hardware simulation), or a combination thereof. The method 400 can create an interstitial video based on a provided template and received interstitial parameters. For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by interstitial creator 235, as shown in FIGS. 2 and 3. In other implementations, the method 400 may be performed by a mobile application or program running on client device 210A.

Referring to FIG. 4, at block 410, method 400 identifies or displays a playlist with pointers to media items. In one implementation, playlist interface module 302 manages the creation and editing of a playlist of media items, in response to commands from a content curator. For example, playlist interface module 302 may receive indications of two or more media items 342, which may be stored in data store 206, and create a new playlist for the media items or add them to an existing playlist. In one implementation, playlist interface module 302 stores the playlist as playlist data 344 in data store 206. The playlist data 344 may include a group of pointers or other references to the actual media items 342 that are stored together as a playlist. Each playlist in playlist data 344 may be assigned a unique identifier that can be used to differentiate one playlist from another. When a curator attempts to edit a playlist, such as active playlist 150, playlist interface module 302 can retrieve the corresponding playlist from playlist data 344 using this unique identifier.

At block 420, method 400 displays a visual indicator at a location in the playlist where an interstitial may be added. In one implementation, media viewer interface module 304 may also display a visual indicator 605 at a location in the active playlist 150 where an interstitial may be added, as shown in FIG. 6A. The visual indicator 605 may take the form of an icon, a symbol, a text block, an arrow, a line, or some other indicator that indicates the location in the playlist 150 where an interstitial may be added. In one implementation, this location is after a first media item and before a second media item (i.e., between two media items). In other implementations, however, the location may be at the beginning or end of the playlist (i.e., before the first media item in the playlist or after the last media item in the playlist).

At block 430, method 400 receives a selection of the displayed visual indicator. Media viewer interface module 304 may also receive a selection of the visual indicator 605 (e.g., through a computer mouse, touchscreen, keyboard, etc.) indicating a curators desire to insert an interstitial into the playlist.

Figure 6B:
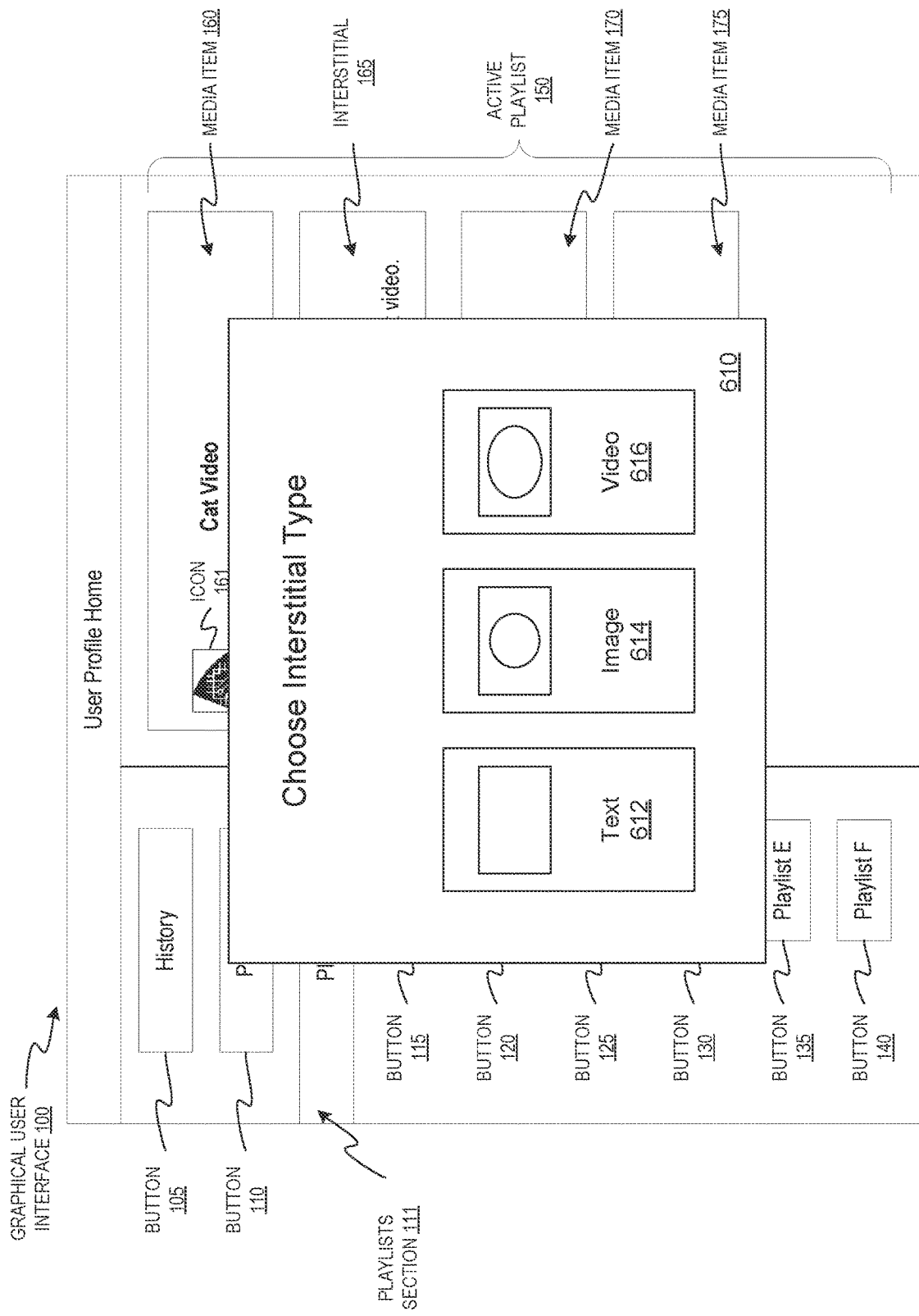
FIG. 6B is a block diagram illustrating an example GUI with a modal window presenting interstitial templates, according to an implementation.

At block 440, method 400 provides an interstitial creation interface. In one implementation, interstitial configuration module 306 may provide one or more interstitial templates 346 in the interface to the curator through the media viewer 211, as shown in interface 610 of FIG. 6B. The interstitial templates 346 may be standardized formats for various types of interstitials. The types may include, for example, text interstitials 612, image interstitials 614, video interstitials 616, or other types of interstitials. Interstitial configuration module 306 may receive a selection of one of the interstitial templates 346 and then collect interstitial configuration parameters according to the selected template.

At block 450, method 400 receives, through the interstitial creation interface, interstitial configuration parameters. In one implementation, the interstitial configuration parameters for a text interstitial include an input text, one or more text options, a duration of the interstitial, and optionally text presentation effects. These parameters may be received through the interface 710 shown in FIG. 7. The interstitial configuration parameters for an image interstitial may include an input image, a duration of the interstitial, and optionally image presentation effects. The input image may be either an uploaded image or a captured image (e.g., via a camera in client device 210A-Z). These parameters may be received through the interface 810 shown in FIG. 8. The interstitial configuration parameters for a video interstitial can include an input video, a duration of the interstitial, and optionally video presentation effects. The input video may be an uploaded video or a captured video, similar to an input image. These parameters may be received through the interface 910 shown in FIG. 9. Interstitial configuration module 306 may store these received configuration parameters as user input data 348 in data store 206.

At block 460, method 400 creates an interstitial based on the received interstitial configuration parameters and inserts a pointer to the interstitial into the playlist. Interstitial configuration module 306 may generate an interstitial based on the selected interstitial template 346 and the received user input data 348. In one implementation, the interstitial may be stored as one of media items 342 in data store 206. The interstitial may be treated much the same as any other media item 342 in the manner in which it is stored and the manner in which it is added to a playlist. For example, once created, interstitial configuration module 306 may signal playlist interface module 302 to add a pointer or other reference to the interstitial from media items 342 to the active playlist in playlist data 344. As a result, the interstitial may be added to the playlist and displayed at the designated location when the playlist is viewed by the curator or other user. In another implementation, the mobile application may provide the interstitial configuration parameters to the server for creation of the interstitial.

Figure 5:
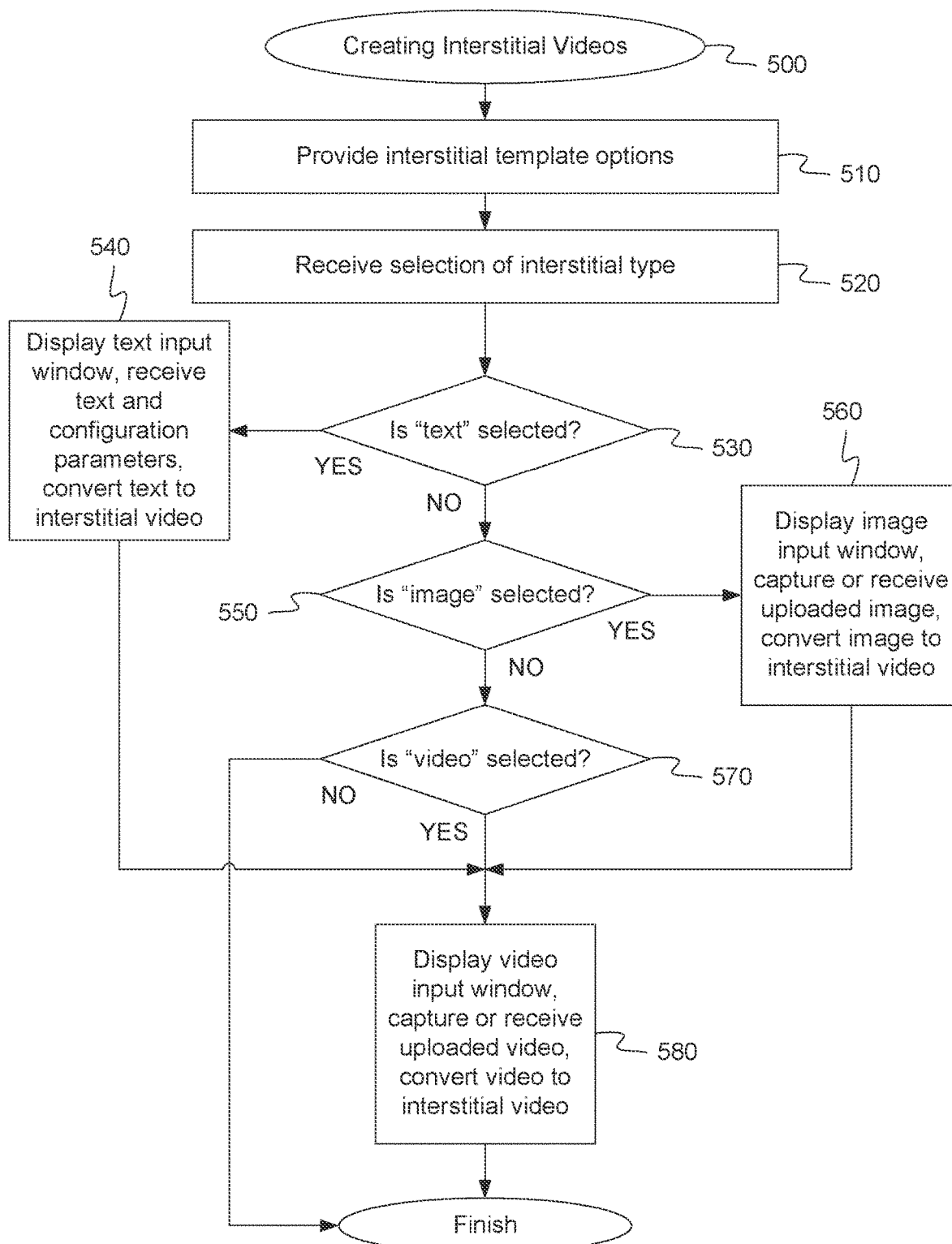
FIG. 5 is a flow diagram illustrating a method for creating interstitial videos, according to some implementations.

FIG. 5 is a flow diagram illustrating a method for creating interstitial videos, according to some implementations. The method 500 may be performed by processing logic that comprises hardware (e.g., circuitry, dedicated logic, programmable logic, microcode, etc.), software (e.g., instructions run on a processing device to perform hardware simulation), or a combination thereof. The method 500 can create an interstitial video based on a provided template and received interstitial parameters. In one implementation, method 500 may be performed by feed privacy module 235, as shown in FIGS. 2 and 3.

Referring to FIG. 5, at block 510, method 500 provides multiple interstitial template options. In one implementation, interstitial configuration module 306 may provide one or more interstitial templates 346 in the interface to the curator through the media viewer 211, as shown in interface 610 of FIG. 6B. The interstitial templates 346 may be standardized formats for various types of interstitials. The types may include, for example, text interstitials 612, image interstitials 614, video interstitials 616, or other types of interstitials.

At block 520, method 500 receives a selection of an interstitial type, based on the templates. Interstitial configuration module 306 may receive a selection of one of the interstitial templates 346 and then collect interstitial configuration parameters according to the selected template. For example, a curator may select one of text interstitial template 612, image interstitial template 614 or video interstitial template 616 using, for example, a computer mouse, touchscreen, keyboard, or other input device.

At block 530, method 500 determines if a text interstitial has been selected. Interstitial configuration module 306 may analyze the received selection to determine what type of interstitial template has been selected.

Figure 7:
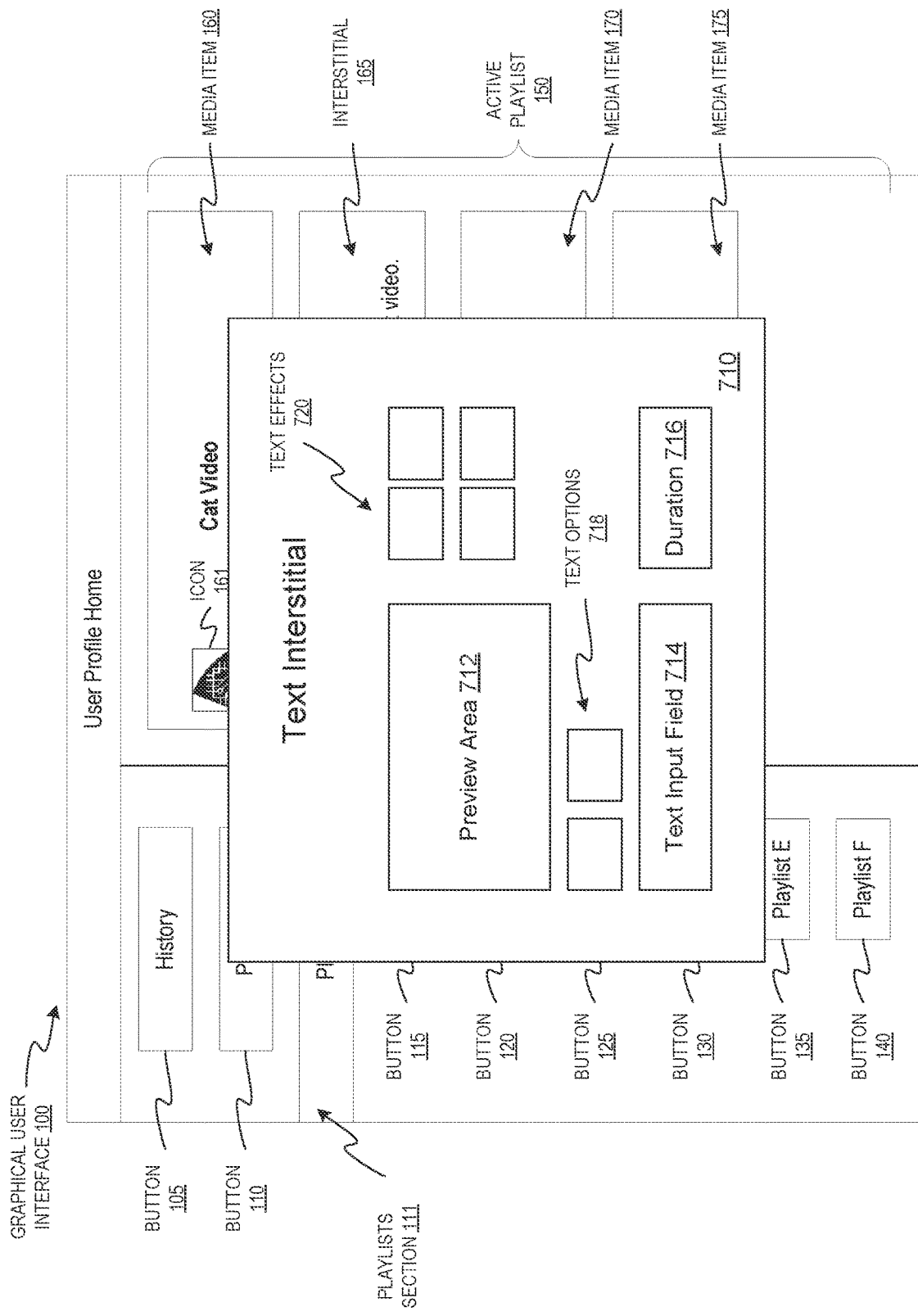
FIG. 7 is a block diagram illustrating an example GUI with a modal window to receive text interstitial parameters, according to an implementation.

If a text interstitial is selected, at block 540, method 500 displays a text input window, receives the input text and other configuration parameters and converts the input text to an interstitial video. FIG. 7 illustrates an interface 710 that serves as a text input window. In one implementation, interface 710 includes an interstitial preview area 712, a text input field 714, a duration field 716, one or more text editing options 718 and one or more text presentation effects 720. The preview area 712 displays a preview of what the interstitial may look like once complete. The preview may be dynamically updated as the curator enters or changes the input parameters. Text input field 714 may receive text (e.g., a series of characters) input by the curator to create the interstitial. The duration field 716 may receive a value representative of a duration of the interstitial. In one implementation, the interstitial may have a default duration (e.g., five seconds) that can be adjusted by the curator as appropriate. The text options 718 may be used to edit the text (e.g., change the font, adjust the size, add bold, underline, italics, etc.). The text presentation effects 720 may include options for how the text is presented in the interstitial. For example, the effects may include a fade effect, a slide effect, a zoom effect, a blur effect, a smoke effect, a comet effect, or some other effects. The curator may adjust these various input parameters using the controls in interface 710.

If a text interstitial is not selected, at block 550, method 500 determines if an image interstitial has been selected. Interstitial configuration module 306 may analyze the received selection to determine what type of interstitial template has been selected.

Figure 8:
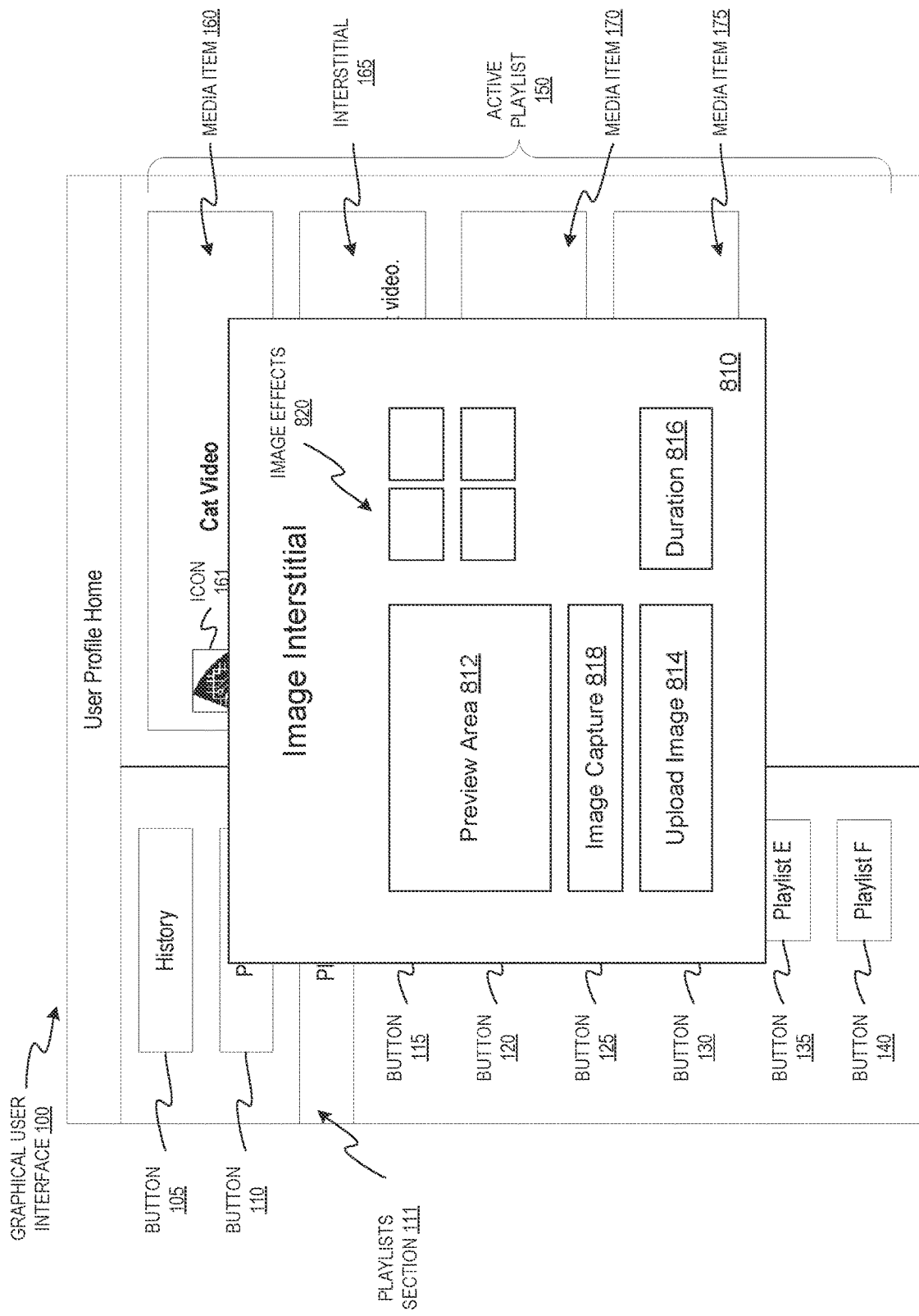
FIG. 8 is a block diagram illustrating an example GUI with a modal window to receive image interstitial parameters, according to an implementation.

If an image interstitial has been selected, at block 560, method 500 displays an image input window, captures or receives an uploaded input image, and converts the input image to an interstitial video. FIG. 8 illustrates an interface 810 that serves as an image input window. In one implementation, interface 810 includes an interstitial preview area 812, an image upload field 814, a duration field 816, an image capture button 818 and one or more image presentation effects 820. The preview area 812 displays a preview of what the interstitial may look like once complete. The preview may be dynamically updated as the curator enters or changes the input parameters. Upload image field 814 may receive an input image uploaded by the curator to create the interstitial. Field 814 may receive the filename, file-path, URL or other identifier of the image to be uploaded. The duration field 816 may receive a value representative of a duration of the interstitial. In one implementation, the interstitial may have a default duration (e.g., five seconds) that can be adjusted by the curator as appropriate. Image capture button 818 may allow the curator to capture a new image (e.g., using a camera on the computing device) to be used as an interstitial. The image presentation effects 820 may include options for how the image is presented in the interstitial. For example, the effects may include a fade effect, a slide effect, a zoom effect, a blur effect, a smoke effect, a comet effect, or some other effects. The curator may adjust these various input parameters using the controls in interface 810.

If an image interstitial is not selected, at block 570, method 500 determines if a video interstitial has been selected. Interstitial configuration module 306 may analyze the received selection to determine what type of interstitial template has been selected.

Figure 9:
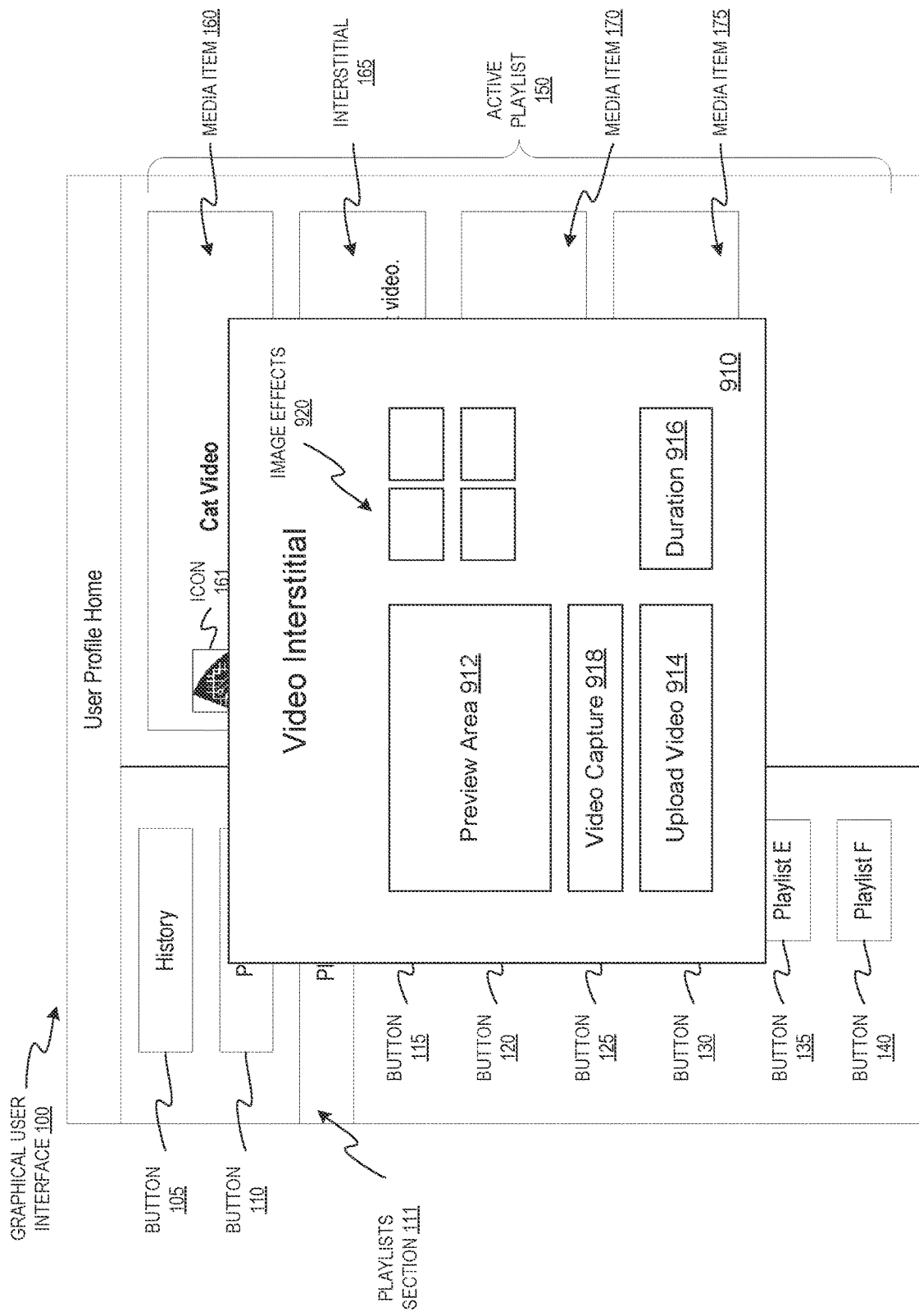
FIG. 9 is a block diagram illustrating an example GUI with a modal window to receive video interstitial parameters, according to an implementation.

If a video interstitial has been selected, at block 580, method 500 displays a video input window, captures or receives an uploaded input video, and converts the input video to an interstitial video. FIG. 9 illustrates an interface 910 that serves as a video input window. In one implementation, interface 910 includes an interstitial preview area 912, a video upload field 914, a duration field 916, a video capture button 918 and one or more video presentation effects 920. The preview area 912 displays a preview of what the interstitial may look like once complete. The preview may be dynamically updated as the curator enters or changes the input parameters. Upload video field 914 may receive an input video uploaded by the curator to create the interstitial. Field 914 may receive the filename, file-path, URL or other identifier of the video to be uploaded. The duration field 916 may receive a value representative of a duration of the interstitial. In one implementation, the interstitial may have a default duration (e.g., five seconds) that can be adjusted by the curator as appropriate. If the length of the input video is longer than the duration value, the input video may be clipped or truncated to have a length matching the duration value. Video capture button 918 may allow the curator to capture a new video (e.g., using a camera on the computing device) to be used as an interstitial. The video presentation effects 920 may include options for how the video is presented in the interstitial. For example, the effects may include a fade effect, a slide effect, a zoom effect, a blur effect, a smoke effect, a comet effect, or some other effects. The curator may adjust these various input parameters using the controls in interface 810.

Figure 10:
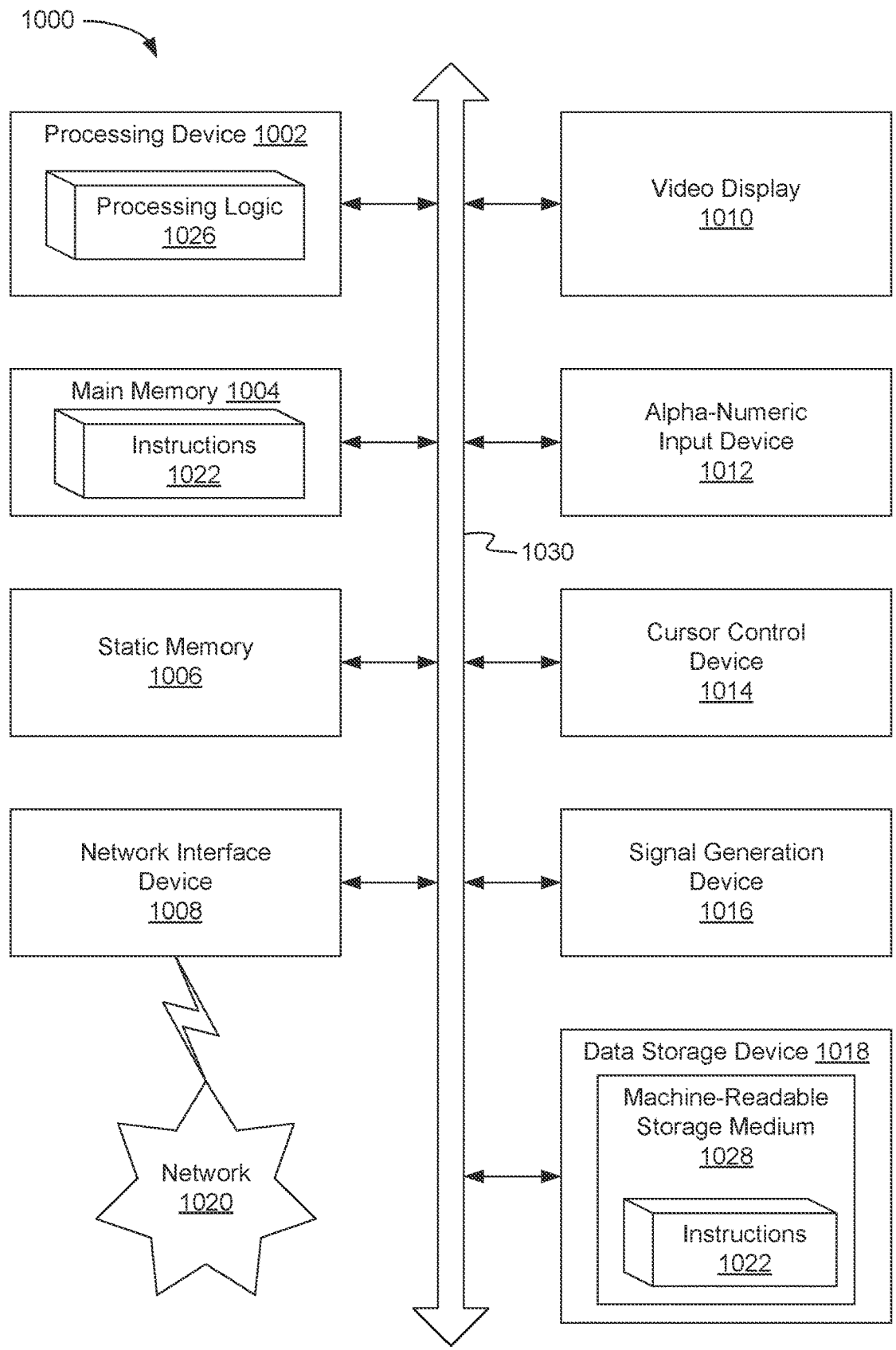
FIG. 10 is a block diagram illustrating an exemplary computer system, according to some implementations.

FIG. 10 illustrates a diagrammatic representation of a machine in the exemplary form of a computer system 1000 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 1000 may be representative of a user device, such as client devices 210A-210Z, or of a server, such as server 230, running interstitial creator 235.

The exemplary computer system 1000 includes a processing device 1002, a main memory 1004 (e.g., read-only memory (ROM), flash memory, dynamic random access memory (DRAM) (such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute processing logic 1026 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a machine-readable storage medium 1028, on which is stored one or more set of instructions 1022 (e.g., software) embodying any one or more of the methodologies of functions described herein. The instructions 1022 may also reside, completely or at least partially, within the main memory 1004 and/or within the processing device 1002 during execution thereof by the computer system 1000; the main memory 1004 and the processing device 1002 also constituting machine-readable storage media. The instructions 1022 may further be transmitted or received over a network 1020 via the network interface device 1008.

The machine-readable storage medium 1028 may also be used to store instructions to perform a method for creating video interstitials, as described herein. While the machine-readable storage medium 1028 is shown in an exemplary implementation to be a single medium, the term "machine-readable storage medium" should be taken to include a single medium or multiple media (e.g., a centralized or distributed database, and/or associated caches and servers)

that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the media server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the web server or media server.

Reference throughout this specification to "one implementation" or "an implementation" means that a particular feature, structure, or characteristic described in connection with the implementations included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method for a creation of playlist interstitials, the method comprising:
providing, by a processing device of a server, an interstitial creation interface for display on a user device, the interstitial creation interface comprising a selectable interstitial indicator located after a first media item in a playlist comprising a plurality of media items, the selectable interstitial indicator presented in the interstitial creation interface after the first media item to indicate that, upon selection, an interstitial is to be added after the first media item in the playlist;
responsive to a user selection of the selectable interstitial indicator located after the first media item in the playlist in the interstitial creation interface, causing presentation of a plurality of user interface (UI) elements allowing a user of the user device to specify interstitial configuration parameters for the interstitial being added to the playlist;
receiving, through the interstitial creation interface, user input for at least a subset of the plurality of UI elements to specify the interstitial configuration parameters for the interstitial; and
creating, by the processing device of the server, the interstitial based on the received interstitial configuration parameters, wherein the created interstitial is supplemental content to be added before or after one of a plurality of files of the plurality of media items.

2. The method of claim 1 wherein the interstitial is created and added to the playlist by the server of a content sharing platform without an upload of the interstitial to the content sharing platform by the user of the user device.

3. The method of claim 1 further comprising:
prior to providing the interstitial creation interface, receiving a request to add the interstitial at a location in the playlist, wherein the location is after the first media item and before a second media item.

4. The method of claim 1 wherein the interstitial creation interface comprises interstitial template options for at least one of a text interstitial, an image interstitial or a video interstitial.

5. The method of claim 4 wherein the interstitial configuration parameters for the text interstitial comprise an input text and a duration of the interstitial, and wherein creating the interstitial comprises converting the input text to the text interstitial.

6. The method of claim 4 wherein the interstitial configuration parameters for the image interstitial comprise an input image and a duration of the interstitial, wherein the input image comprises at least one of an uploaded image or a captured image, and wherein creating the interstitial comprises converting the input image to the image interstitial.

7. The method of claim 4 wherein the interstitial configuration parameters for the video interstitial comprise an input video and a duration of the interstitial, wherein the input video comprises at least one of an uploaded video or a captured video, and wherein creating the interstitial comprises converting the input video to the video interstitial.

8. A non-transitory machine-readable storage medium storing instructions which, when executed, cause a processing device of a server to perform operations comprising:
providing an interstitial creation interface for display on a user device, the interstitial creation interface comprising a selectable interstitial indicator located after a first media item in a playlist comprising a plurality of media items, the selectable interstitial indicator presented in the interstitial creation interface after the first media item to indicate that, upon selection, an interstitial is to be added after the first media item in the playlist;
responsive to a user selection of the selectable interstitial indicator located after the first media item in the playlist in the interstitial creation interface, causing presentation of a plurality of user interface (UI) elements allowing a user of the user device to specify interstitial configuration parameters for the interstitial being added to the playlist;

receiving, through the interstitial creation interface, user input for at least a subset of the plurality of UI elements to specify the interstitial configuration parameters for the interstitial; and creating the interstitial based on the received interstitial configuration parameters, wherein the created interstitial is supplemental content to be added before or after one of a plurality of files of the plurality of media items.

9. The non-transitory machine-readable storage medium of claim 8 wherein the interstitial is created and added to the playlist by the server of a content sharing platform without an upload of the interstitial to the content sharing platform by the user of the user device.

10. The non-transitory machine-readable storage medium of claim 8 wherein the operations further comprise:

prior to providing the interstitial creation interface, receiving a request to add the interstitial at a location in the playlist, wherein the location is after the first media item and before a second media item.

11. The non-transitory machine-readable storage medium of claim 8 wherein the interstitial creation interface comprises interstitial template options for at least one of a text interstitial, an image interstitial or a video interstitial.

12. The non-transitory machine-readable storage medium of claim 11 wherein the interstitial configuration parameters for the text interstitial comprise an input text and a duration of the interstitial, and wherein creating the interstitial comprises converting the input text to the text interstitial.

13. The non-transitory machine-readable storage medium of claim 11 wherein the interstitial configuration parameters for the image interstitial comprise an input image and a duration of the interstitial, wherein the input image comprises at least one of an uploaded image or a captured image, and wherein creating the interstitial comprises converting the input image to the image interstitial.

14. The non-transitory machine-readable storage medium of claim 11 wherein the interstitial configuration parameters for the video interstitial comprise an input video and a duration of the interstitial, wherein the input video comprises at least one of an uploaded video or a captured video, and wherein creating the interstitial comprises converting the input video to the video interstitial.

15. A server computer system comprising:
a memory; and
a processing device, coupled to the memory, to perform operations comprising:

providing an interstitial creation interface for display on a user device, the interstitial creation interface comprising a selectable interstitial indicator located after a first media item in a playlist comprising a plurality of media items, the selectable interstitial indicator presented in the interstitial creation interface after the first media item to indicate that, upon selection, an interstitial is to be added after the first media item in the playlist;

responsive to a user selection of the selectable interstitial indicator located after the first media item in the playlist in the interstitial creation interface, causing presentation of a plurality of user interface (UI) elements allowing a user of the user device to specify interstitial configuration parameters for the interstitial being added to the playlist;

receiving, through the interstitial creation interface, user input for at least a subset of the plurality of UI elements to specify the interstitial configuration parameters for the interstitial; and creating the interstitial based on the received interstitial configuration parameters, wherein the created interstitial is supplemental content to be added before or after one of a plurality of files of the plurality of media items.

16. The system of claim 15 wherein the interstitial is created and added to the playlist by the server of a content sharing platform without an upload of the interstitial to the content sharing platform by the user of the user device.

17. The system of claim 15 wherein the operations further comprise:

prior to providing the interstitial creation interface, receiving a request to add the interstitial at a location in the playlist, wherein the location is after the first media item and before a second media item.

18. The system of claim 15 wherein the interstitial creation interface comprises interstitial template options for at least one of a text interstitial, an image interstitial or a video interstitial.

\* \* \* \* \*